United States Patent [19]

Skala et al.

[11] 4,149,643
[45] Apr. 17, 1979

[54] TRUCK TOW LIFT

[76] Inventors: Kent D. Skala, Shores Plaza; John N. Turley, Rte. 3, Box 17, both of Eldon, Mo. 65026

[21] Appl. No.: 839,012

[22] Filed: Oct. 3, 1977

[51] Int. Cl.² .............................................. B60P 3/12
[52] U.S. Cl. ................................... 414/563; 280/402; 280/415 A
[58] Field of Search ......... 214/86 A; 280/402, 415 R, 280/415 A, 415 B, 423 R, 423 B

[56] References Cited

U.S. PATENT DOCUMENTS

| | | | |
|---|---|---|---|
| 2,481,223 | 9/1949 | Johnson | 214/86 A |
| 2,604,302 | 7/1952 | Francis | 254/139.1 |
| 3,123,380 | 3/1964 | Grim et al. | 280/404 |
| 3,715,042 | 2/1973 | Rellinger | 214/86 A |
| 4,047,733 | 9/1977 | Parkes | 214/86 A X |

*Primary Examiner*—Robert G. Sheridan
*Attorney, Agent, or Firm*—Fishburn, Gold and Litman

[57] ABSTRACT

A truck tow lift for connection to the fifth wheels of opposingly aligned trucks provides a means for towing one such vehicle with the other. The structure comprises an elongate beam member having downwardly extending standard SAE kingpins rigidly mounted on opposing ends, one of which is engaged into the fifth wheel of the tow truck, thereby becoming a horizontally pivotable and vertically rigid boom or extension of the frame thereof. Lifting means are mounted on the beam member and are connected to a lifting bar for raising the rear wheels of the towed truck off the ground. To connect the beam member to the truck to be towed, the operator positions the kingpin of the free end of the beam member over the fifth wheel of the towed truck so that it can be received therein upon lifting and attaches the lifting bar to the rear frame members. Then, the operator hoists the rear wheels of the towed truck off the ground and locks the kingpin into the fifth wheel. Conventional safety chains are attached and the truck can be towed.

8 Claims, 4 Drawing Figures

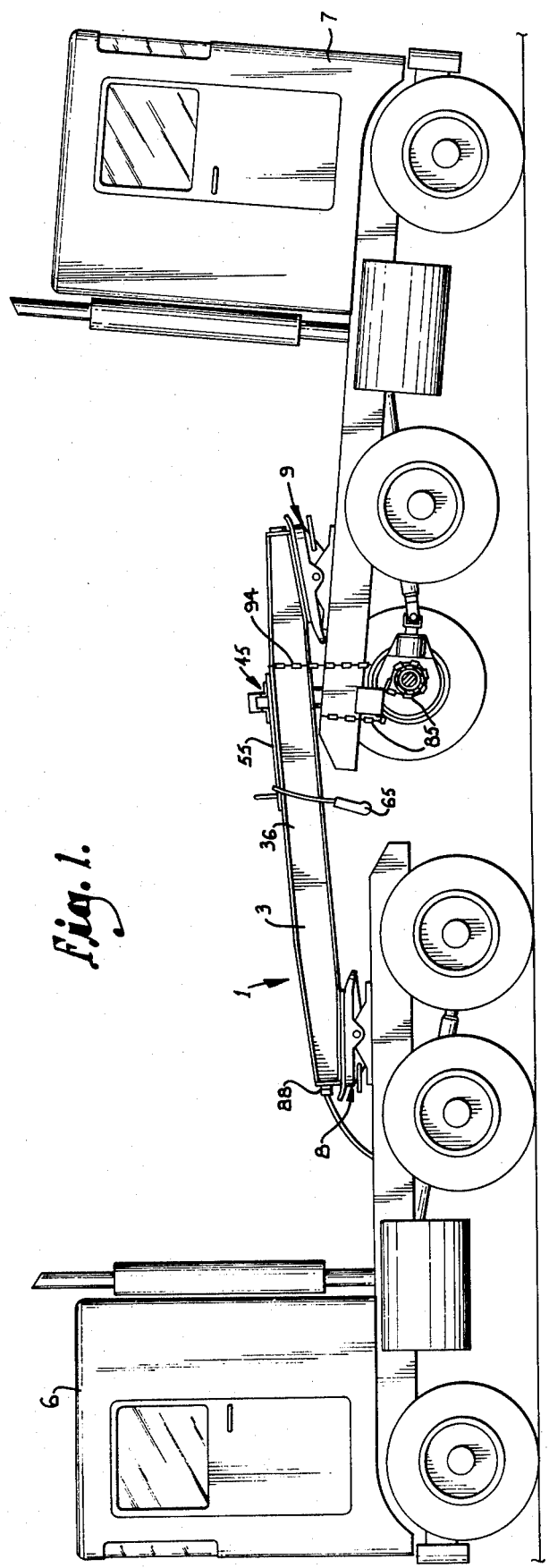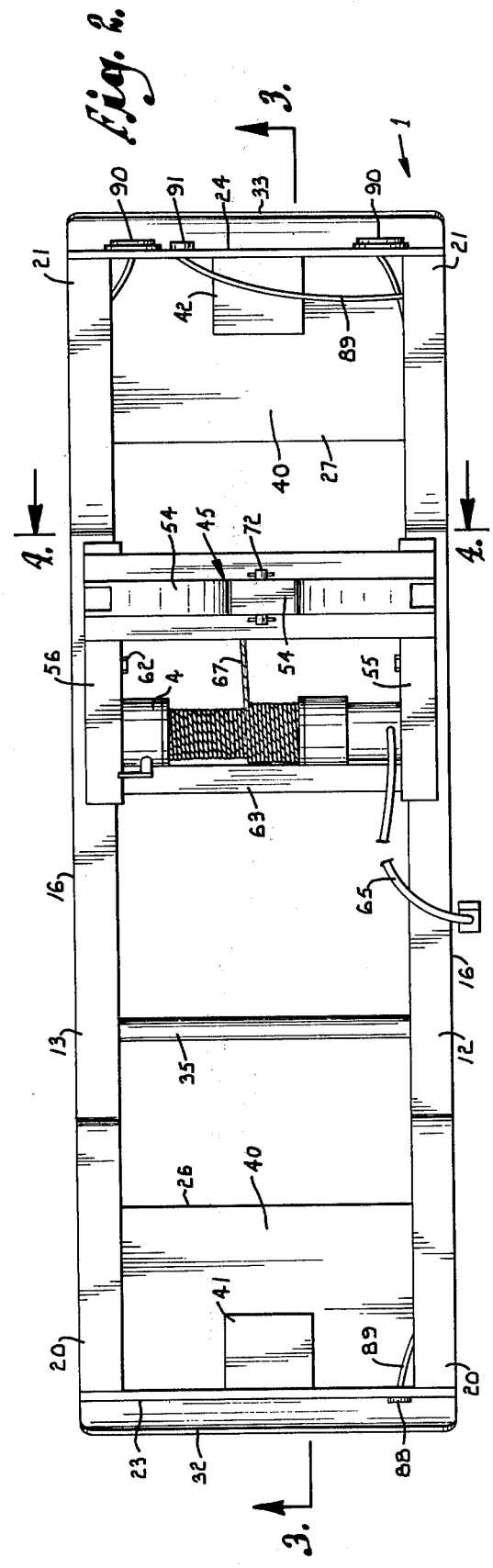

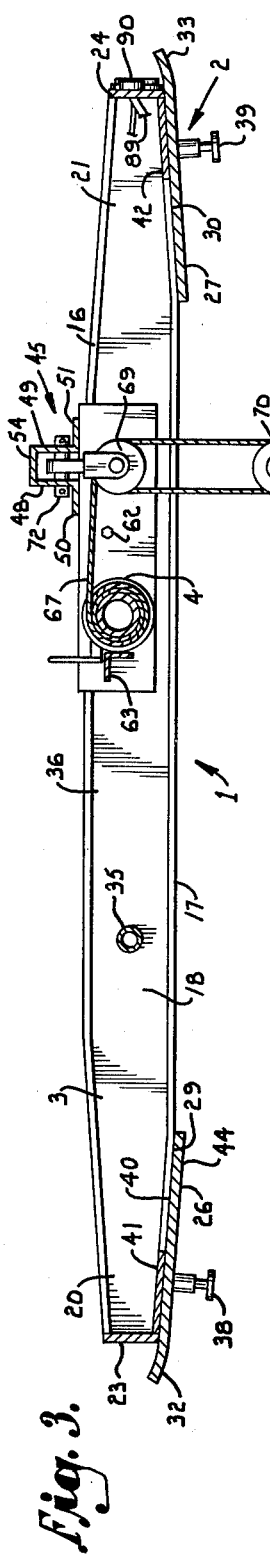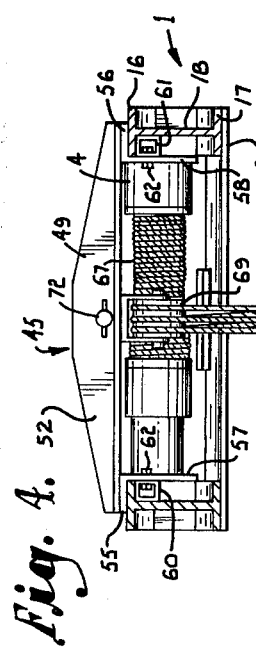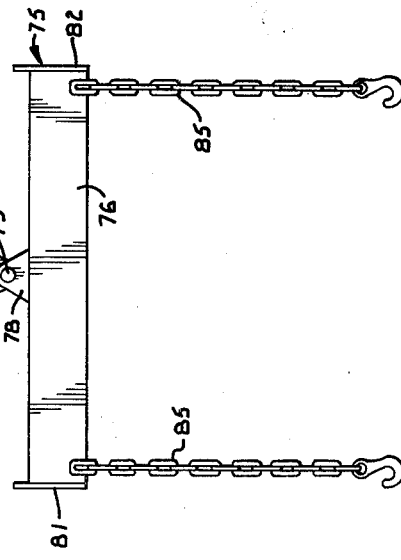

TRUCK TOW LIFT

This invention relates to an apparatus for connecting vehicles together to permit one vehicle to tow the other and particularly relates to a truck tow lift connectible to standard fifth wheels of tractor trucks.

Occasionally while on the road, a tractor truck breaks down or becomes disabled, necessitating that it be towed to a suitable repair site. Typically, a specialized tow truck is dispatched from a repair station, which may be quite far away from the disabled truck, to retrieve the vehicle. Towing charges can be substantial as a specially constructed tow truck usually represents a significant investment. In other situations not involving a disabled vehicle, it may be desirable to shuttle a tractor truck from one location to another by towing, thereby not requiring a driver for the towed vehicle and saving increasingly high fuel costs.

While there have been many inventions relating to hoists, tow bars, and the like, most prior art devices require extensive modification to the tow vehicle and/or costly fixed crane and winch assemblies to lift the axles of the towed vehicle for proper transportation. Others connect onto the front of a vehicle to be towed and permit the vehicle to be pulled with all wheels contacting the road, necessitating that the drive shaft of the towed vehicle be disconnected, a time-consuming task.

Recognizing the difficulties attendent to the use of typical prior art devices, the present invention comprises an inexpensively fabricated truck tow lift having opposing ends detachably connectible to the fifth wheels of opposingly aligned tractor trucks. Securely connected thereto, the truck tow lift forms a horizontally pivotable and vertically rigid extension of the frame of the tow truck and includes a winch which raises the rear axle and wheels of the vehicle to be towed off the ground for transportation. The truck tow lift can also be regarded as a horizontally and vertically rigid yoke connected to the towed truck, thus comparing the arrangement to a single axle trailer.

The principle objects of the present invention are: to provide a means for towing and transporting one truck by another; to provide a truck tow lift connectible between the standard fifth wheels of opposingly aligned trucks, thereby connecting one truck to another; to provide a truck tow lift having a lifting means and fastening members associated therewith connectible with the rear axle and frame portions of a truck to be towed and lifting the wheels from contact with the ground; to provide a truck tow lift connectible onto the standard fifth wheel of a tow truck, thereby forming a ridig extension of the tow vehicle; and to provide such a truck tow lift which is relatively inexpensive, sturdy and efficient in use and particularly well adapted for its intended purpose.

Other objects and advantages of this invention will become apparent from the following description taken in connection with the accompanying drawings wherein are set forth, by way of illustration and example, a certain embodiment of this invention.

FIG. 1 is an elevational view illustrating a truck tow lift, embodying this invention, connecting a pair of tractor trucks in back to back relation and supporting the rear axles and wheels of the towed truck off the ground.

FIG. 2 is a top plan view of the truck tow lift.

FIG. 3 is a fragmentary view of the truck tow lift taken along lines 3—3, FIG. 2, and shows certain features thereof.

FIG. 4 is a fragmentary view of the truck tow lift taken along lines 4—4, FIG. 2, to illustrate certain details thereof.

Referring more in detail to the drawings:

As required, a detailed embodiment of the present invention is disclosed herein, however, it is to be understood that the disclosed embodiment is merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

The reference numeral 1 generally indicates a truck tow lift structure embodying the present invention, having mounting means 2 connectible to fifth wheels of tractor trucks, an elongated beam member rectangular frame 3 and a lifting mechanism or winch means 4 operable to raise the rear wheels of a towed truck off the ground.

FIG. 1 illustrates the truck tow lift 1 detachably connected to a pair of opposingly aligned tractor trucks consisting of a first tow truck 6 and a second towed truck 7. Both trucks 6 and 7 have standard SAE fifth wheels 8 and 9 equiped with standard locking devices and are secured to frame members. Typically, the fifth wheel is the strongest connection point on the truck, acting as a fulcrum or pressure point to place weight upon the rear axles of the tow truck 6 and to lift the rear axles of the towed truck 7. In operation, the truck tow lift 1 is connected to the fifth wheels 8 and 9 by means described hereinbelow and is locked thereto, providing a horizontally pivotable and vertically rigid extension of the tow truck 6 for supporting the towed truck 7.

The frame 3 of the truck tow lift 1 is comprised of a pair 4 of sturdily constructed elongated beam members 12 and 13, FIG. 2, illustrated herein as I-beams, though box beams, bars, and the like may be used if desired. The beam members 12 and 13 have upper and lower flanges 16 and 17 connected by webs 18 and are convergingly tapered outwardly on opposing ends 20 and 21. The beam members 12 and 13 are secured together by a pair of end members, shown herein as elongated bars 23 and 24, which extend laterally across the ends 20 and 21. A pair of sturdy plate members 26 and 27 are secured by conventional means, such as welding, in underlying relation to upwardly and outwardly bottom tapered surfaces 29 and 30 of the respective ends 20 and 21. The plate members 26 and 27 include slightly curved projections or lips 32 and 33 extending outwardly therefrom and beyond the end bars 23 and 24 to provide slidable guides for positioning the truck tow lift 1 on the fifth wheels 8 and 9. Adding rigidity to the frame 3, a strengthening member, here illustrated as a pipe 35, extends transversely between the webs 18 of the beam members 12 and 13 and is longitudinally positioned between a mid-portion 36 and the end 20.

As illustrated in FIG. 3, the mounting means 2 include a pair of standard SAE kingpins 38 and 39 affixed to the lateral mid-portion of the lower surfaces 44 of the plate members 26 and 27 and extending outwardly from the frame 3. The kingpins 38 and 39 are rigidly secured to the plate members 26 and 27 by conventional means such as welding and are reinforced in position by strengthening members 41 and 42, here shown by way of example as rectangular plates affixed to the plate members 26 and 27 on the surface 40 opposite the kingpins 38 and 39.

A movable hanger or bridge member 45 extends transversely across the frame 3 and retains the lifting or winch means 4 connected thereto for raising the rear end of the towed truck 7. As shown in FIGS. 3 and 4 by way of example, the bridge member 45 comprises a pair of angle beams 48 and 49 transversely spaced from each other and having outwardly extending flanges 50 and 51. The webs 52 of the angle beams 48 and 49 are tapered outwardly and downwardly and are connected together, as by welding, by plates 54. The ends of the angle beams 48 and 49 are respectively mounted upon angle beams 55 and 56 extending normal thereto and forming runners slidably engaged with the beam members 12 and 13. The angle beams 48 and 49 have downwardly projecting flanges 57 and 58 adjoining the inwardly-facing portions of the beam members 12 and 13 and have a pair of elongated guide members or box beams 60 and 61 parallelly mounted thereto by suitable fasteners 62. The box beams 60 and 61 are positioned so as to slide on the lower surface of the upper flanges 16, permitting the bridge member 45 to be translatable without binding or excessive wobbling. The bridge member 45 is slidable on the frame 3 between the pipe 35 and the beginning of the tapered end 21, permitting a wide range of adjustment to adapt to differently shaped trucks.

To maintain a proper relationship for operation, the lifting or winch means 4 is received between the angle beams 55 and 56 and spaced apart from the bridging angle beams 48 and 49. An angle beam 63 adjoins the winch means 4 and extends transversely between the flanges 57 and 58 to rigidly maintain the latter in a constant relative position. The winch means 4 is of virtually any commercially suitable type sufficiently strong enough to raise and support the heavy rear end portions of a truck to be towed. This is typically an electrically powered winch driven by the electrical system of the tow vehicle or alternatively connected to self-contained and rechargeable storage batteries (not shown). Accordingly, the illustrated example includes an electrical cord and control switch 64 connected to the winch means 4. The winch means 4 contains a length of flexible line connector or cable 67 extending through conventionally constructed upper and lower sheaves 69 and 70. The upper sheave 69 depends from the longitudinal mid-portion of the bridging angle beams 48 and 49 and is rotatably connected thereto by conventional means, herein illustrated as a pin or axle 72 extending transversely therebetween, suspending the sheave 69 from the space between the beams 48 and 49.

Drawable toward the upper sheave 69 by operation of the winch means 4, the lower sheave 70 is rotatably mounted upon a lifting bar 75 suspended from the frame 3 and having appropriate dimensions to engage the rear frame members of the towed truck 7 and lift the same, raising the rear wheels off the ground. In the illustrated example, the lifting bar 75 is comprised of an elongated box beam 76 having a sheave mount positioned thereon at the longitudinal mid-portion. The sheave mount includes a pair of laterally spaced and upwardly extending arms 78 having a pin 79 extending transversely thereacross and retaining the lower sheave 70. As the upper and lower sheaves 69 and 70 have limited rotation in a vertical plane, the lifting bar 75 can swing laterally as well as longitudinally without placing undue stress upon the sheave connections. The opposite ends of the lifting bar 75 are capped by plates 81 and 82 having slight projections to catch and retain a truck frame member. A plurality of chains 85 or the like, flexible connecting members are secured to the lifting bar 75 by conventional means such as welding and are detachably connectible to a truck frame.

Providing electrical power lines to the winch means 4, the frame 3 has an electrical inlet connection 88 and electrical lines 89 extending therefrom to the winch means 4 and to combination brake and tail lights 90. To power the front parking lights of the towed truck 7, if desired, an electrical outlet 91 is included.

In the use of this invention, as illustrated in FIG. 1, the truck tow lift structure 1 is lifted above the rear frame members of the tow truck 6 and the kingpin 38 manuevered into engagement in the fifth wheel 8, which is then locked into a substantially horizontal position. The tow truck 6 is backed into position adjoining the truck 7 so that the other kingpin 39 is vertically aligned with the kingpin receiving opening of the towed truck fifth wheel 9. Next, the bridge member 45 is slid to a suitable position and the lifting bar 75 positioned under the rear frame members of the towed truck 7 and secured by wrapping the chains 85 around the axles or other suitable connection points. The operator activates the winch means 4 to lift the rear wheels of the truck 7 off the ground, drawing the truck frame upwardly and closer to the truck tow lift 1. Once the wheels are off the ground, the truck 7 is secured by wrapping safety chains 94 (not shown) which are attached to the lower flanges of the angle beams 55 and 56 around the beam members 12 and 13 and the rear frame of the truck and locking the kingpin 39 into the fifth wheel 9. When the kingpins 38 and 39 are engaged within the respective fifth wheels 8 and 9, the plates 26 and 27 are rotatingly abutingly engaged with the associated members of the respective fifth wheels, permitting horizontal rotation of the towed truck 7 relative to the tow truck 6 as corners are turned during towing. Once chained and locked in position, the tension of the winch means 4 can be slightly loosened and the load distributed between the safety chains and the winch. After connecting the electrical lines, the front wheels of the towed truck 7 are straightened and the steering wheel is fixed in position by nylon straps or conventional and well known means to prevent pivoting of the front wheels, thusly readying the truck 7 for towing by the truck 6 to a suitable repair station. The truck tow lift 1 can be removed from the trucks 6 and 7 by reversing the above recited steps and detaching the same for removal to a remote location for storage.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. A truck tow lift arrangement comprising:
 (a) a first truck having forward and rear end portions and a fifth wheel mounted on said rear end portion;
 (b) an elongate beam member having first and second end portions;
 (c) first and second kingpins fixed to said first and second end portions respectively and depending therefrom, said first kingpin being operatively engaged and locked in the fifth wheel of said first truck;

(d) said second kingpin being operatively engageable with a fifth wheel of a second truck having a rear end thereof supported by rear wheels and positioned adjacent to and spaced from the rear end portion of said first truck; and (e) a lifting mechanism mounted on said elongate beam and having connecting means extending therefrom from a point on said elongate beam substantially over the rear end of said second truck and attachable to said rear end for lifting and supporting said rear wheels of said second truck from ground contact for towing by said first truck.

2. A truck tow lift arrangement comprising:
(a) a first truck having forward and rear end portions and a fifth wheel mounted on said rear end portion;
(b) an elongate beam member having first and second end portions;
(c) first and second kingpins fixed to said first and second end portions respectively and depending therefrom, said first kingpin being operatively engaged and locked in the fifth wheel of said first truck;
(d) said second kingpin being operatively engageable with a fifth wheel of a second truck, having a rear end thereof supported by rear wheels and positioned adjacent to and spaced from the rear end portion of said first truck;
(e) a lifting mechanism mounted on said elongate beam for positioning substantially over the rear end of said second truck and operatively connected thereto for lifting and supporting said rear wheels of said second truck from ground contact for towing by said first truck; and
(f) first and second plate members positioned at the first and second end portions of said beam member respectively, each of said plate members having one of said kingpins mounted thereon and including a lower surface thereof shaped for abutting engagement with an associated fifth wheel;
(g) said beam member including a pair of elongate, spaced apart supports transversely interconnected by said first and second plate members and forming a rigid frame; and
(h) said lifting mechanism being positioned between said supports.

3. A truck tow lift arrangement as set forth in claim 2 wherein:
(a) said first and second plate members include reinforcing members securely retaining each of said kingpins mounted thereon.

4. A truck tow lift arrangement as set forth in claim 3 wherein:
(a) said lifting mechanism is associated with a slidable bridge member extending transversely across said spaced supports of said frame.

5. A truck tow lift arrangement as set forth in claim 4 wherein:
(a) said lifting mechanism includes a winch means.

6. A truck tow lift arrangement as set forth in claim 5 including:
(a) a pair of sheaves associated with said winch means and through which a flexible line connector extends, said sheaves facilitating raising of said rear wheels by said winch.

7. A truck tow lift arrangement as set forth in claim 6 including:
(a) a lifting bar suspended from said winch by a flexible line connector, said lifting bar having a plurality of flexible members mounted thereon for detachably connecting said lifting bar to said second truck rear end portion.

8. A truck tow lift structure connectible to the fifth wheels of opposingly aligned trucks for towing a second of said trucks by a first of said trucks, said truck tow lift structure comprising:
(a) an elongate beam member having opposite end portions;
(b) first and second kingpins fixed on said opposite end portions and depending therefrom, said kingpins being operatively engageable and lockable in the fifth wheels of said trucks;
(c) lifting means mounted on said beam member and having a flexible line connector extending therefrom for detachable connection to a frame member of said second truck for selectively raising the rear wheels thereof whereby said second truck is towable with said rear wheels lifted from ground contact; and
(d) said lifting means being positioned on a bridge member slidably mounted on said beam member and adjustable in position therealong.

* * * * *